United States Patent

[11] 3,602,477

| [72] | Inventor | Carl J. Queen<br>5310 Peachtree Dunwoody Road N.E.,<br>Atlanta, Ga. 30342 |
|---|---|---|
| [21] | Appl. No. | 800,470 |
| [22] | Filed | Feb. 19, 1969 |
| [45] | Patented | Aug. 31, 1971 |

[54] APPARATUS FOR MOLDING SADDLETREES
5 Claims, 8 Drawing Figs.

[52] U.S. Cl. .................................................. 249/170,
18/4 P, 18/20 Q
[51] Int. Cl. .................................................... B41b 11/52
[50] Field of Search ............................................ 18/20 I, 20
S, 26 R, 42 M, 34 S, 19 F; 249/170, 171

[56] References Cited
UNITED STATES PATENTS

| 705,146 | 7/1902 | Richter | 249/170 X |
| 802,455 | 10/1905 | Kinyer | 249/170 X |
| 1,948,146 | 2/1934 | Warren | 249/171 |
| 2,655,710 | 10/1953 | Rosensch et al. | 18/42 X |
| 2,691,190 | 10/1954 | Bethe et al. | 249/170 |
| 2,745,138 | 5/1956 | Beattie | 249/170 X |
| 3,005,235 | 10/1961 | Pateria | 18/20 X |
| 3,126,594 | 3/1964 | Galloway | 18/42 X |
| 3,128,505 | 4/1964 | Ludwig | 18/34 X |
| 3,281,901 | 11/1966 | Davis et al. | 249/170 X |
| 3,302,244 | 2/1967 | Ludwig | 18/30 |
| 3,356,044 | 12/1967 | Keathley et al. | 249/170 X |
| 1,906,882 | 5/1933 | Perret | 249/171 X |

FOREIGN PATENTS

| 1,003,033 | 9/1965 | Great Britain | 249/170 |

*Primary Examiner*—J. Howard Flint, Jr.
*Attorney*—Jones & Thomas

ABSTRACT: A method and apparatus for molding saddletrees wherein saddletrees are fabricated with a fiberglass shell filled with a wood filler. A plurality of sectional molds are passed through a circular path where the molding process steps take place. The molds are coated with a lubricant, the lubricant is dried, and a mixture of fiberglass and polyester resin is applied to the surfaces of the mold cavity. After the fiberglass mixture is cured, a filler comprising polyester resin and wood chips is placed in the mold cavities, and the sections of the mold are connected together. When the mixtures within the mold are cured, an unusually strong, water impervious, and lightweight saddletree is formed.

PATENTED AUG 31 1971
3,602,477
SHEET 1 OF 4
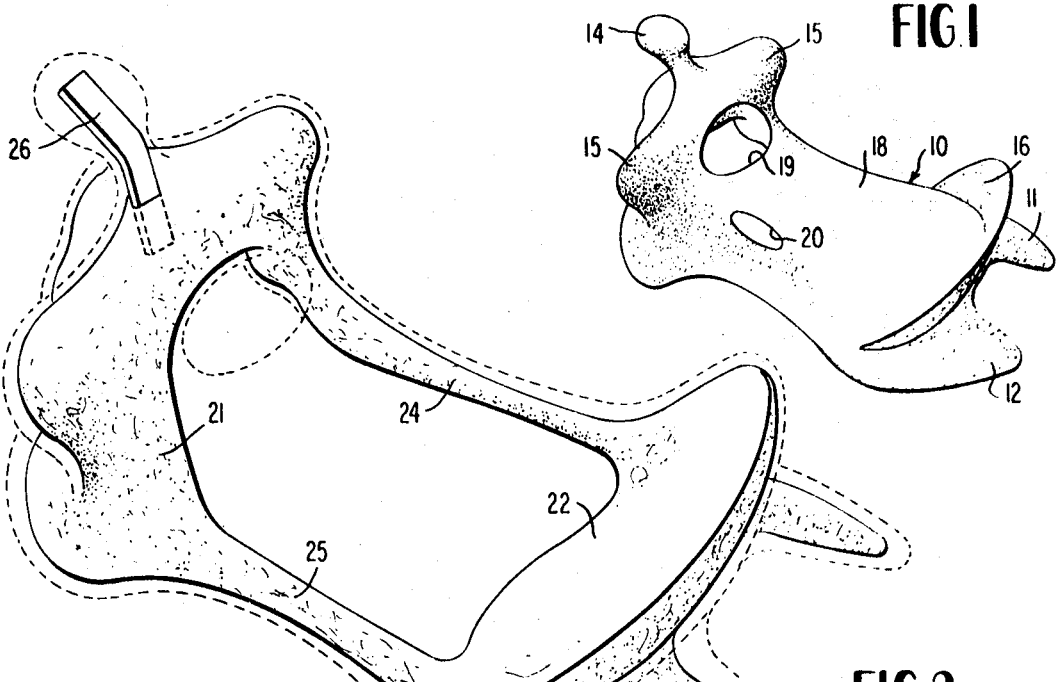
FIG.1
FIG.2
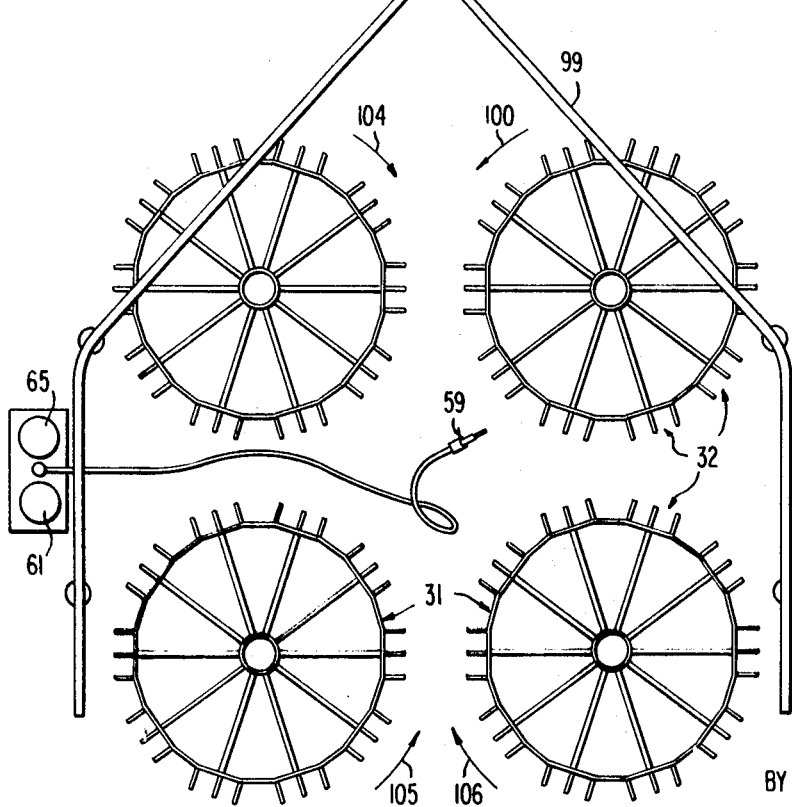
FIG.3
INVENTOR
CARL J. QUEEN
Jones & Thomas
BY
ATTORNEYS 3,602,477

APPARATUS FOR MOLDING SADDLETREES

BACKGROUND OF THE INVENTION

Saddles produced for the purpose of riding horses historically have been constructed with a wooden "tree" which is covered with leather and various attachments are connected to the tree and the leather. The wooden saddletree is usually formed in sections which include a pair of supporting rails shaped to extend along the back of the horse, a front pommel structure which is connected to the forward upper surface of the supporting rails, and the rear cantle structure which is connected to the rear upper surface of the rails. The lower surfaces of the rail sections are shaped to generally conform to the upper surface of the back of a horse, and the upper surfaces of the rail sections and pommel and cantle sections form a seat for the upper legs and buttocks of a human rider. The various pieces of a saddletree are curved and define slopes and angles which conform and merge with each other to form the curved seat surfaces. These sections are individually cut and formed, and are usually nailed, stapled or screwed together. The saddletree forms the basic support structure for the leather and other attachments of the overall saddle assembly.

The procedures for cutting the individual saddletree pieces are such that each piece is individually cut and shaped in an individual manner, so that no two corresponding pieces are identically sized or shaped. Furthermore, the hand process of assembling the pieces of a saddletree is subject to human error, so that the pieces are almost always poorly aligned or positioned together, and the nails or screws used to connect the pieces together are frequently improperly inserted, which may weaken or damage the saddletree. Thus, the poor formation of the individual sections of the saddletree and the inaccurate assembly of the sections together results in a poorly shaped saddletree, which eventually results in a poorly shaped saddle.

After the basic saddletree has been assembled, the center portion of the saddletree must be built up to form the middle seat surface of the saddle. This is usually accomplished by attaching a combination of materials to the rails and cantle section of the saddletree. These materials include sheet metal, plastic, leather, felt, and various scraps of material to fill in hollows and voids formed in a defective saddletree structure. The build up of the center of the saddletree must be carefully accomplished so that a relatively smooth surface is provided for the leather covering.

When the leather is applied to the typical saddletree, it must be carefully cut and placed on a form, wetted, and pounded to make it assume the shape of the form. The leather is then transferred to the built up saddletree and seamed together about the tree. In completing the typical saddle assembly, it is frequently necessary to penetrate the leather by boring a hole through the leather and the saddletree, or by driving nails or screws through the leather into the saddletree in order to connect the various attachments to the saddle. When the leather covering is penetrated in this manner, the inner saddletree is exposed, at least to some extent, to the atmosphere and moisture and other contaminants will reach the wood of the saddletree. This creates a condition where the nail is likely to rust and the wood of the saddletree is likely to rot. Also, the hole in the leather of the saddletree tends to create a weak spot in the leather which may tear or split with aging. Once a saddletree has become damp due to atmospheric conditions or due to sweat from the horse or its rider, the saddletree does not dry easily since the leather protects it from the atmosphere. If a saddle having a damp tree is exposed to freezing temperature, the moisture in the saddletree may freeze and split the wood, and since the dampness of a saddletree usually occurs around a nail, the freezing and rotting of the saddletree will usually be in the vicinity of the nail, causing the nail to become loose.

SUMMARY OF THE INVENTION

Briefly described, the present invention comprises apparatus for molding saddletrees of a liquid impervious material on a mass production basis. Each saddletree produced with the molding procedure is of a uniform size and shape so that the leather to be applied to the saddletree can be cut from standard patterns to minimize leather waste and streamline the fabrication of saddles. The tree is shaped so that it does not have to be built up in the center portion to form a comfortable seat surface, and the leather can be applied directly to the saddletree with the wetting and pounding steps being performed as the leather rests directly on its tree. The molding process includes the use of sectional molds mounted on rotatable supports, so that the molds can be passed through various stations where different steps in the molding process can be carried out.

Thus, it is an object of this invention to provide apparatus for molding saddletrees fabricated from fiberglass, wood chips, and polyester resin.

Another object of this invention is to provide a mass production apparatus for molding saddletrees which are of uniform size, shape, and weight, and which are extremely strong and durable.

Another object of this invention is to provide a mold for forming saddletrees which can be rapidly connected and disconnected, and a mold support which maintains the mold sections so that they can be pivoted into and out of connection with each other.

Other objects, features and advantages of the present invention will become apparent upon reading the following specification, when taken in conjunction with the accompanying drawing.

BRIEF DESCRIPTION OF THE DRAWING

FIG. 1 is a perspective view of a saddletree formed by the method and apparatus disclosed herein.

FIG. 2 is a perspective view of the saddletree of FIG. 1 with the shell of the saddletree being shown in broken lines to expose the filler material within saddletree.

FIG. 3 is a plan view of a plurality of rotatable mold support frames, and their associated equipment.

DESCRIPTION OF THE PREFERRED EMBODIMENT

Figure 4:
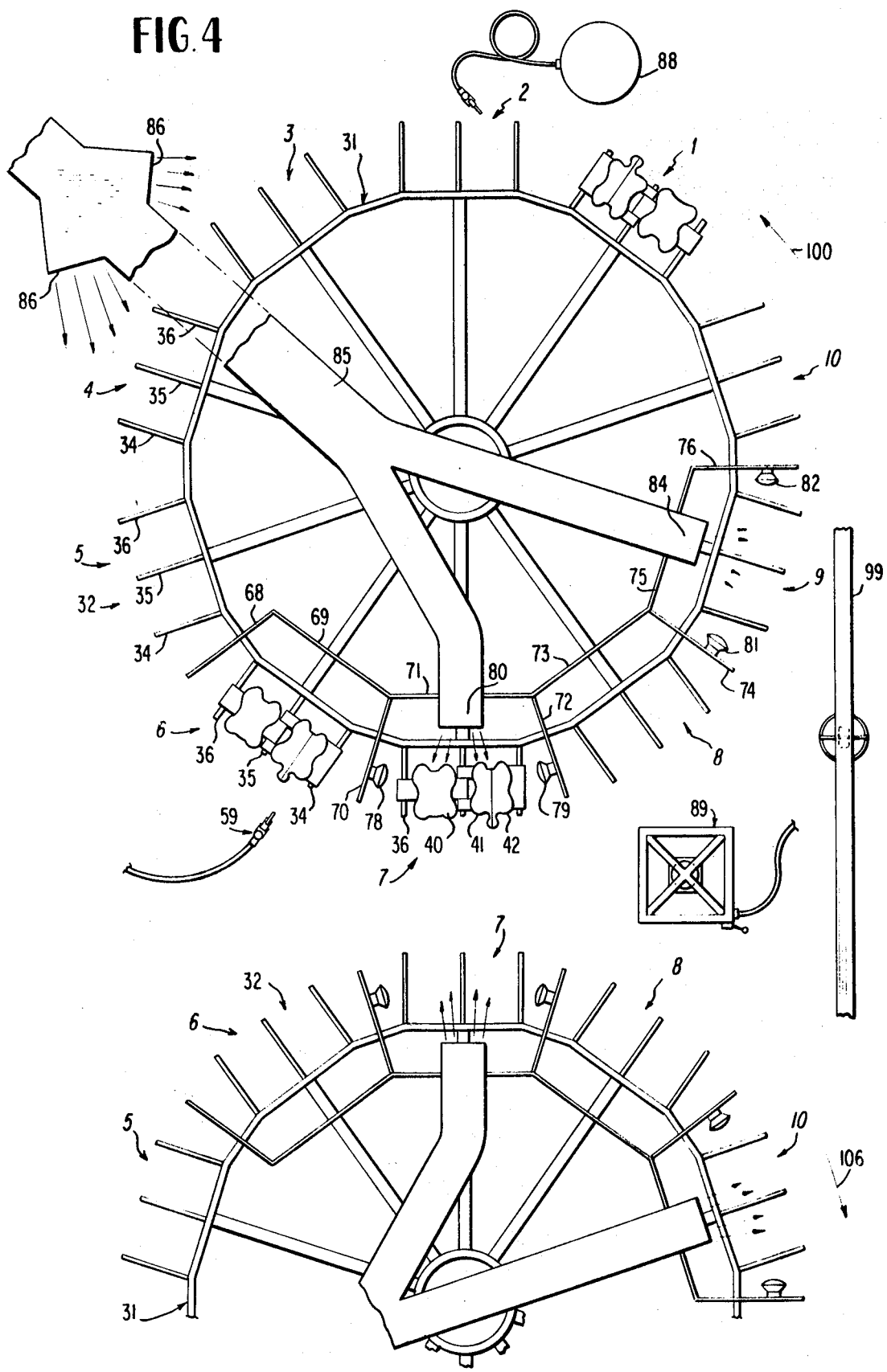
FIG. 4 is a partial plan view of two adjacent rotatable mold support frames.

Referring now in more detail to the drawing, wherein like numerals indicate like parts throughout the several views, FIG. 1 shows a saddletree 10 which includes rails 11 and 12, pommel 14, pommel support shoulders 15, cantle 16, and seat surface 18. Seat opening 19 is located between seat surface 18 and pommel 14, and stirrup openings 20 are positioned between seat surface 18 and rails 11 and 12.

As is shown in FIG. 2, saddletree 10 comprises a hollow shell and defines hollow portions in the vicinity of pommel support shoulders 15, pommel 14, cantle 16, and rails 11 and 12. Filler material 21 is placed in the forward portion of the saddletree within pommel support shoulders 15, and similar filler material 22 is placed in the interior section beneath cantle 16. Rails 11 and 12 are filled with similar filler material 24 and 25. Thus, substantially the entire hollow interior portion of saddletree 10 is filled with the filler material, which leaves primarily only seat area 18 without filler material. Pommel 14 not only includes the material extending up from pommel support shoulders 15, but bar 26 extends from pommel 14 down into the center portion of pommel support shoulders 15. Bar 26 functions to rigidify pommel 14, and to anchor pommel 14 to its support shoulders.

Figure 5:
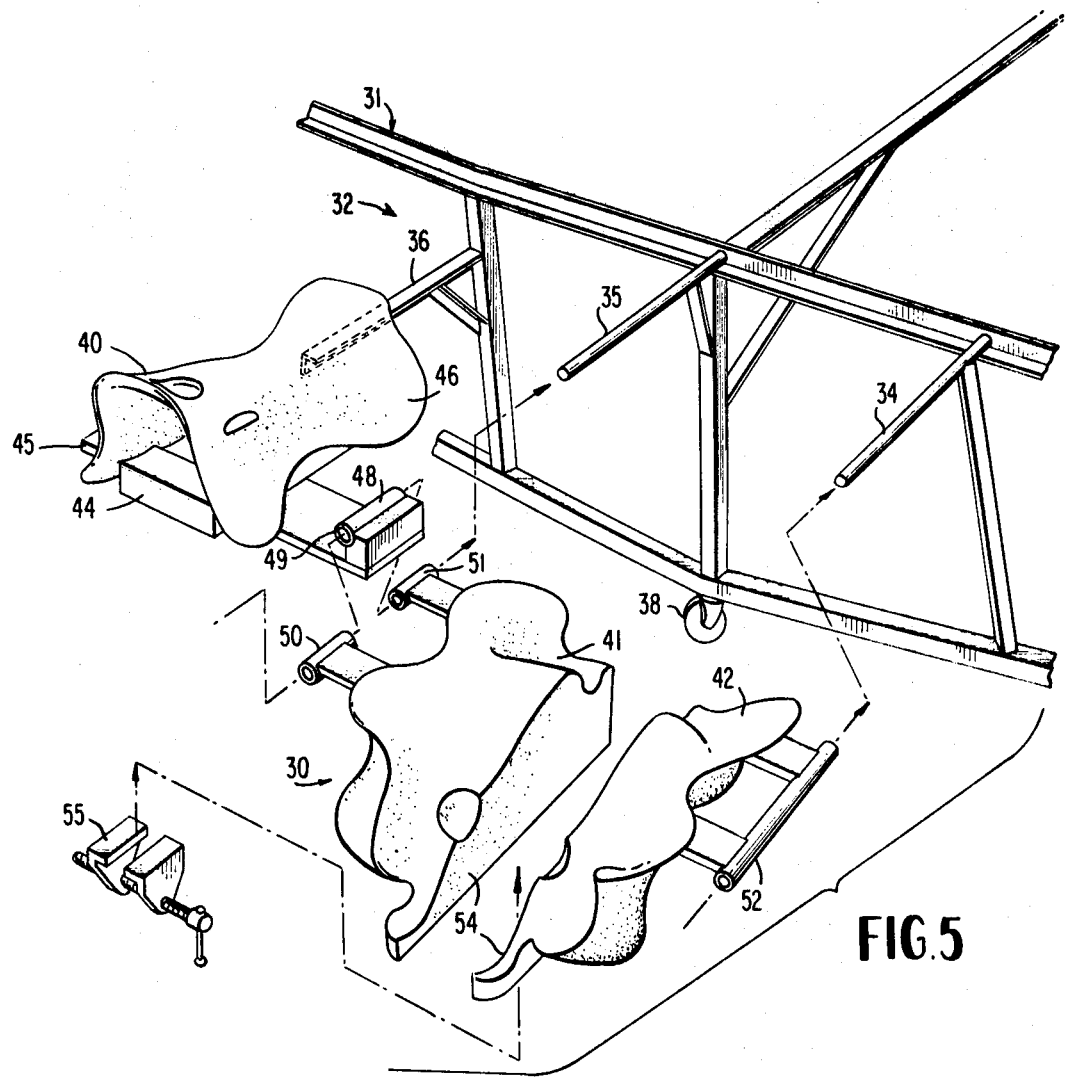
FIG. 5 is a partial view of one of the rotatable mold support frames, and a sectional mold is shown suspended adjacent the frame.
Figure 6:
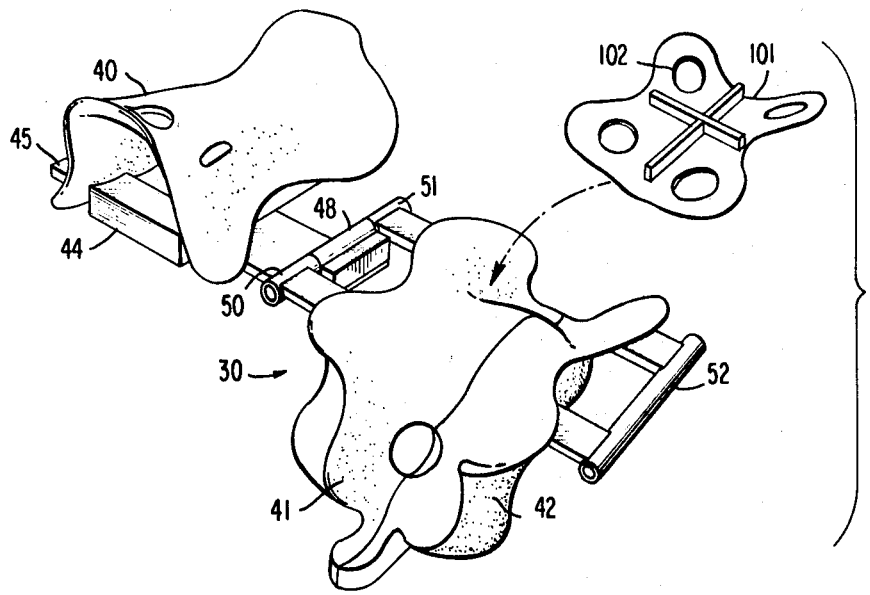
FIG. 6 is a perspective view of a sectional mold, with a packing former shown suspended above the mold sections.

As is best shown in FIGS. 5 and 6, saddletrees 10 are fabricated with the use of sectional molds 30. Molds 30 are placed on mold support frames 31 (FIGS. 3 and 4), and processed through the various molding stations of the mold support frames. As is best illustrated in FIG. 3, a plurality of rotatable mold support frames 31 are arranged closely together, and they are rotatably supported from the floor surface. Each frame includes 10 mold support areas 32 which include horizontally extending support bars 34, 35, and 36. Support bars 34 and 35 are tubular, and extend substantially parallel to each other, while support bar 36 is generally parallel to the support bars 34 and 35 and is positioned on a level below support bars 34 and 35. The remainder of mold support frame 31 is formed essentially of angle iron and is arranged so that each mold support area is equally spaced about the mold support frame 31, essentially in a circular arrangement. The center of the mold support frame is supported by a vertical axle structure, which is not specifically shown, and wheels 38 support the frame at spaced intervals around its edges, so that the frame can be rotated by hand, or through mechanical means.

As is best shown in FIG. 5, sectional mold 30 comprises bottom surface mold 40, and a top surface mold which is split along its length to form sections 41 and 42. Mold sections 40–42 are fabricated of fiberglass and polyester resin, and are built up with various rigidifying and supporting elements. Bottom surface mold 40 includes support elements 44 and 45, and a mold surface or mold cavity 46. The assembly includes socket 48 which defines opening 49 that can be telescoped over tubular support bar 35. When socket 48 is inserted over support bar 35, the opposite end of support member 45 will rest on the top surface of support bar 36, so that the mold surface 46 is facing in an upward direction. Mold sections 41 and 42 have similar rigidifying and supporting structures, which are not specifically shown, and aligned sockets 50 and 51 are connected to mold section 41, and socket 42 is connected to mold section 42. Sockets 50 and 51 are spaced apart a distance sufficient to accommodate socket 48 of mold section 46, so that sockets 50 and 51 can be aligned with socket 48 and inserted over tubular support bar 35 and both mold sections 41 and 40 can be supported simultaneously by tubular support bar 35. Socket 52 of mold section 42 is insertable over tubular support bar 34.

When mold sections 40, 41, and 42 are inserted onto tubular support bars 34 and 35, mold sections 41 and 42 can be pivoted together so that their flat complementary surfaces 54 will abut each other and their mold surfaces become coextensive. Mold sections 41 and 42 are clamped together in this manner by means of any conventional clamp, such as clamp 55. With this arrangement, mold sections 41 and 42 form the top surface mold area for a saddletree while mold section 40 forms the bottom surface of a saddle tree. Mold section 40 is pivotal about tubular support bar 35 so that it can come to rest on support bar 36 and all of the surfaces of the mold cavity will be exposed and accessible to the workmen, and so that it can be pivoted into closed relationship with mold sections 41 and 42.

Figure 7:
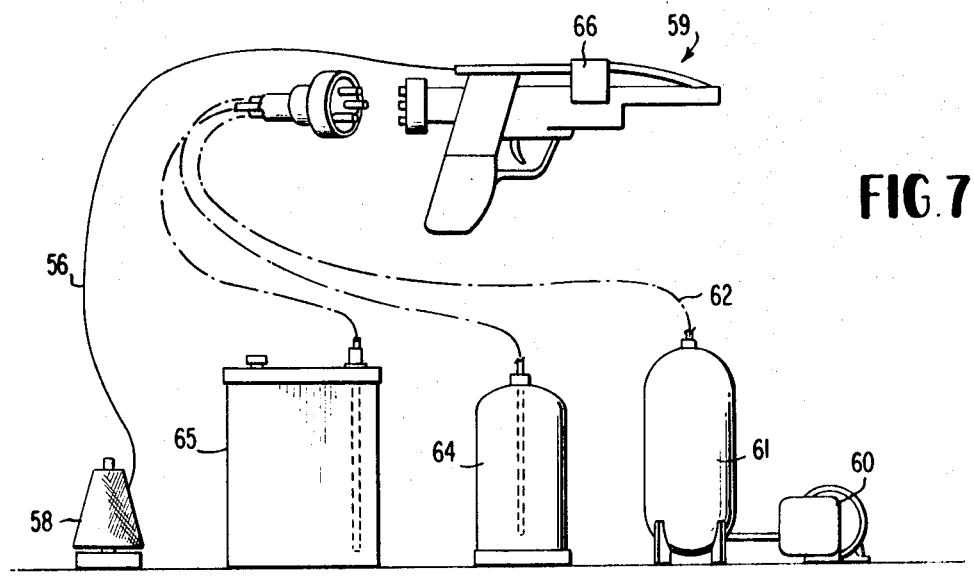
FIG. 7 is a schematic showing of the apparatus utilized to fill the mold cavities.

As is shown in FIG. 7, apparatus is provided for supplying fiberglass and polyester resin to the mold surfaces. A string 56 of fiberglass extends from a source of fiberglass yarn 58 toward an applicator 59. Compressor 60 supplies tank 61 with compressed air, which is also extended to applicator 59 through conduit 62. The compressed air is used as the motivating fluid to pump catalyst from reservoir 64 and resin from its supply tank 65, and to operate chopping mechanism 66 to chop the fiberglass yarn 56. Applicators 59 are available on the market place and are disclosed herein only in the way of example. Various other and different applicators can be utilized, if desired. Generally, the principle of operation is to apply a mixture of chopped fiberglass, polyester resin, and a catalyst to the surface of the saddletree molds. The applicator provides a convenient and rapid method of application; however, the fiberglass mixture can be applied by hand, if necessary, as set forth in my copending application, Ser. No. 774,263.

As is shown in FIG. 4, stationary partitions 68, 69, 70, 71, 72, 73, 74, 75, and 76 are suspended above mold support frame 31, and are arranged to divide the area above the mold support frame into various process stations. The station defined by partitions 70, 71, and 72 include heat lamps 78 and 79, and air vent 80, so that this station can be utilized as a drying and curing station. Also, partitions 74, 75, and 76 include heat lamps 81 and 82, and air vent 84, so that it also is a drying and curing station. Vents 80 and 84 are connected to a common duct 85, which extends back toward the source of air and heat. Side grates 86 open the main common duct 85 so that a flow of air is received generally over mold support frame 31 at the stations adjacent partition 68.

As is shown in FIG. 4, a lubricant applicator 88 is provided for applying lubricant to the mold surfaces, and a press 89 is provided for clamping the mold sections together. Press 89 is shown in more detail in FIG. 8 and includes frame 90 having lower horizontal bar 91 and upper horizontal bar 92. Double-acting ram 94 is connected to upper bar 92, and control valve 95 functions to extend or retract the piston from ram 94. Press 89 is utilized to force mold section 40 down into mating relationship with mold sections 41 and 42. After the sections have been mated together by the use of press 89, a clamp 96 of conventional construction is utilized to keep the mold sections in firm contact with each other, and valve 95 is reversed to retract ram 94, whereupon press 89 is removed from about the mold sections.

In order to supply the various mold support frames 31 with the filler material which includes a mixture of wood chips, polyester resin, and a catalyst, a supply 98 of these materials is maintained at a remote station (FIG. 3), and a worker mixes these materials together. The mixture is usually mixed in a bucket, and the bucket is placed on an overhead trolley rail 99 and rolled on the rail toward the station where it is to be used. The rails extend toward the station where it is to be used. The rails extend toward the stations adjacent the mold support frames 31 where the buckets traveling thereon can be easily reached by the workers that are placing the filler material in the molds.

OPERATION

A worker places the sections of a saddletree mold on the support bars of a mold support area at station 1 (FIG. 4), and connects mold sections 41 and 42 together, and allows mold section 40 to rest on support bar 36, so that the arrangement is substantially as shown in FIG. 6. The mold cavities or surfaces are then coated with a wax. When mold support frame 31 is rotated in the direction as indicated by arrow 100, the sectional mold is then located so that a liquid lubricant can be applied to the mold surfaces by applicator 88. During the next movements of mold support frame 31, the mold will pass through stations 3, 4, and 5, where the liquid lubricant is allowed to dry. Air flowing through grates 86 of duct 85 will pass into the vicinity of the mold, to assist in the drying function. When the mold is rotated into station 6, an operator will apply a mixture of fiberglass, polyester resin, and a catalyst to the mold surfaces, either by hand, or by use of an applicator such as applicator 59. The fiberglass can be either finely chopped, or in the form of matts of fiberglass. When the operator is through with the application of the fiberglass mixture at the application station 6 of one of the mold support frames 31, he can move to an adjacent mold support frame 31 and apply the fiberglass mixture to the mold surfaces of a mold that has been prepared on the adjacent mold support frame. This process is repeated by the operator until the molds of all four mold support frames 31 have been properly treated. By the time the operator has finished with all four mold support frames 31, the first mold support frame 31 will have been rotated so that an uncoated mold surface is presented at station 6, and the cycle can be repeated.

When the saddletree mold passes from station 6 to station 7 an operator is available to clean or trim any excess fiberglass mixture from the mold surfaces or from the external surfaces of the mold, and heat lamps 78 and 79, together with air vent 80 function to increase the curing of the fiberglass mixture. The operator at station 7 can also move to the other stations adjacent the center of the area of the adjacent mold support frames 31, to perform similar or different functions about each mold support frame. By the time the mold support frame 31 is rotated to move the mold sections from station 7 to station 8, the fiberglass mixture will have been substantially cured. At station 8 an operator retrieves the filler mixture from rail 99 and fills the mold cavities with this mixture. Bar 26 (FIG. 2) is inserted into the cavity that forms the pommel of the saddletree. As is shown in FIG. 6, a packing former 101 can be used to accurately place and position the filler material in the mold cavity so that an adequate amount of material will be properly positioned in the cavity without having to repeatedly position mold section 40 onto mold sections 41 and 42. Openings 102 are present in packing former 101 so that the filler material can be adjusted and rearranged as might be necessary by the operator without having to remove packing former 101 from mold sections 41 and 42. Of course, the shape of packing former 101 generally conforms to the mold cavity of mold sections 41 and 42.

Figure 8:
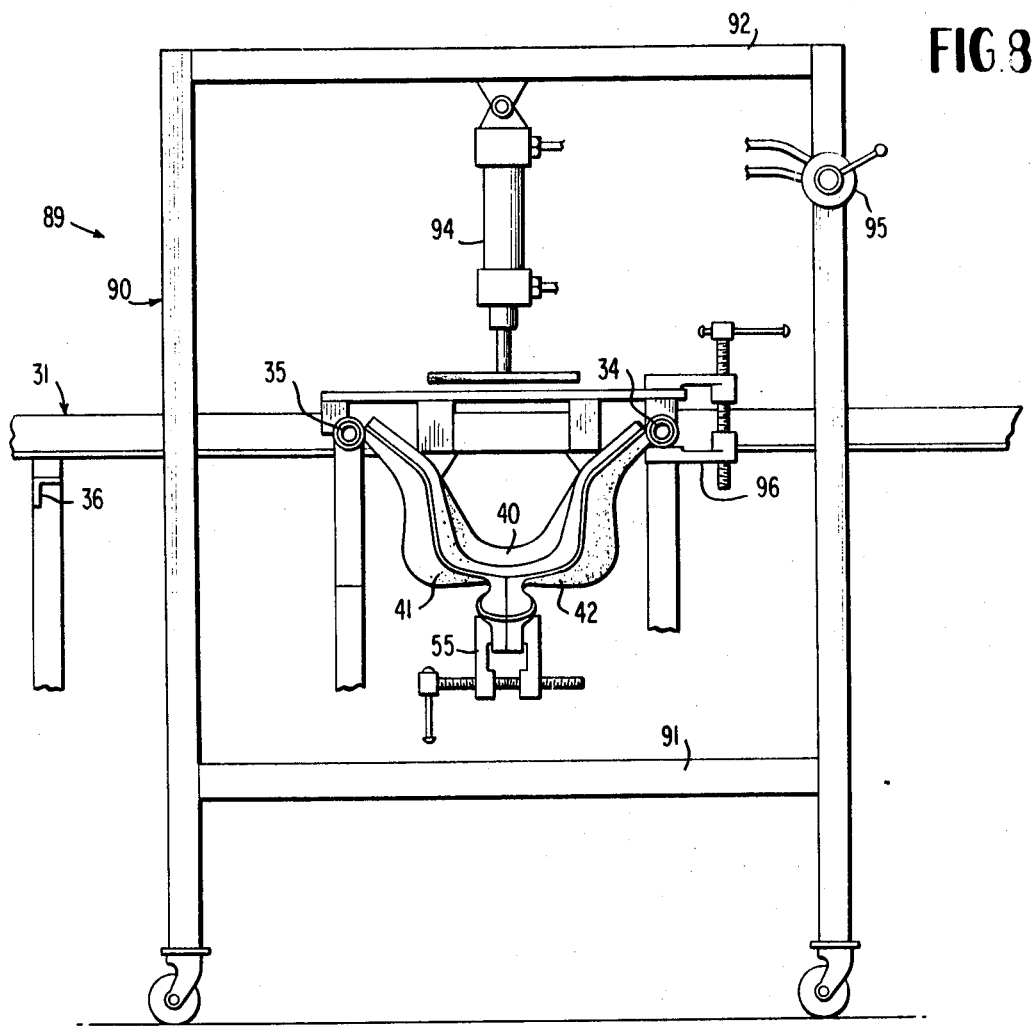
FIG. 8 is a side elevational view of the press utilized to close the mold sections.

After the proper amount of filler material has been applied to the mold, an additional amount of the fiberglass mixture is applied to the edges of the mold sections and mold section 40 is rotated about its tubular support bar 35 so that it closes the mold cavity. Presser 89 is fitted over the closed mold, and its ram 94 is energized by valve 95 to press mold section 40 into closed relationship with mold sections 41 and 42 (FIG. 8). A clamp of the type shown at 96 in FIG. 8 is used to maintain the mold sections in a closed relationship, and press 89 is deactivated and removed.

When mold support frame 31 is again rotated the mold will move into station 9 where it is cured by heat lamps 81 and 82 and by air vent 84. Of course, the catalyst in the filler mixture and fiberglass mixture aids in the curing, so that the curing time is relatively short.

When mold support frame 31 is again rotated, the mold will move from station 9 to station 10, where it can be disassembled by removing its clamps. The produce formed by the sectional mold will be the saddletree shown in FIG. 1.

Since the sectional mold is movable into and out of closed relationship by merely pivoting the sections about support bars 34 and 35, the sections of the mold never have to be removed from mold support frame 31. Thus, when the saddletree which has been molded through the various process steps described herein has been removed from the sectional mold, the sectional mold can be laid out as previously described in station 1 without breaking the sequence of steps in the process.

The arrangement of mold support frames 31 as shown in FIG. 3 is such that optimum use of operator time and equipment useage is attained. The mold support frames are arranged to rotate in the directions indicated by arrows 100, 104, 105, and 106, and the stationary partitions (FIG. 4) are placed so that they generally face the inside area of the four mold support frames, which locates station 6 of each mold support frame 31 at a position convenient to the operator of fiberglass applicator 59, to obtain optimum use of this worker and his equipment. The direction of rotation of each mold support frame from station 6 is calculated to maintain optimum performance from the workers and their equipment at the subsequent work stations.

The arrangement of support bars 34, 35, and 36, (FIG. 5) is such that mold sections 40, 41, and 42 are easy to connect together and to disconnect, and so the mold sections are always maintained in a convenient position.

While process stations 7 and 9 (FIG. 4) have been shown as curing stations and utilizing both heat lamps and air vents to force heated or unheated air onto the external surfaces of the mold sections to aid in the curing function, it should be understood that various different curing aids can be utilized. For instance, only air vents can be utilized, various different heat applicators can be utilized, or a combination of various different curing aids can be utilized. The partitions surrounding stations 6, 7, 8, and 9 tend to isolate these stations from each other and from the other stations about mold support frame 31, so that the ground fiberglass from applicator 59 will not tend to drift to an adjacent station, and so the heat and glare from the curing stations will not become uncomfortable to the workers in the other stations. Of course, the curing stations can be further closed in by using additional partitions, curtains, or other separating dividers, if desired.

While this invention has been described in detail, with particular reference to preferred embodiments thereof, it will be understood that variations and modifications can be effected within the spirit and scope of the invention as described hereinbefore and as defined in the appended claims.

I claim:

1. A mold assembly for forming saddletrees or the like comprising a pair of spaced support bars, a sectional mold comprising an upper mold section pivotally connected at one of its edges to one of said support bars and pivotal from one side of its support bar over its support bar to a position between said support bars, a pair of lower mold sections each pivotally connected at one edge to one of said support bars and pivotable on said support bars from below said support bars to a position generally between said support bars and into abutting relationship with each other and into mating relationship with said upper mold section to form with said mold section a mold cavity.

2. The mold assembly of claim 1 and wherein the lower mold sections together define a surface shaped for forming the upper surface of a saddletree and the upper mold section defines a surface shaped for forming the lower surface of a saddletree.

3. The mold assembly of claim 1 and further including a rotatable mold support frame connected to and supporting said sectional mold.

4. A mold assembly for forming saddletrees or the like comprising a pair of spaced generally horizontal support bars, a sectional mold comprising an upper mold section for forming the lower surface of a saddletree pivotally connected at one of its edges to one of said support bars in a manner so that it can pivot from a position beside said support bars with its molding surface facing in an upward direction over its support bar to a position generally between said support bars with its molding surface facing in a downward direction, a pair of lower mold sections for forming the upper surface of a saddletree each pivotally connected at one of its edges to one of said support bars in a manner so that the lower mold sections are pivotal from positions below said support bars to positions generally between said support bars and in abutting relationship with each other with their molding surfaces facing in an upward direction and in mating relationship with said upper mold section to form with said upper mold section a mold cavity.

5. The mold assembly of claim 4 and wherein said lower mold sections together form a pommel portion of a saddletree mold and said lower mold sections are separable in the pommel section of the mold.